INVENTOR.
Eugenio Lubatti

Jan. 10, 1967  E. LUBATTI  3,297,810
APPARATUS FOR THE PRODUCTION OF ABRASIVE CARBIDES
Filed Nov. 29, 1963  2 Sheets-Sheet 2

INVENTOR.
Eugenio Lubatti

United States Patent Office 3,297,810
Patented Jan. 10, 1967

3,297,810
APPARATUS FOR THE PRODUCTION OF
ABRASIVE CARBIDES
Eugenio Lubatti, Novara, Italy, assignor to Montecatini Societa Generale per l'Industria Mineraria e Chimica, Milan, Italy
Filed Nov. 29, 1963, Ser. No. 326,857
Claims priority, application Italy, Dec. 4, 1962, 23,869/62
14 Claims. (Cl. 13—9)

My invention relates to apparatus and method for producing abrasive carbides and more particularly to an electric arc furnace and operating method for production of such abrasive carbides as that of titanium, zirconium, silicon and particularly of boron, the furnace being generally suitable for producing materials that react in solid and/or pasty form and which melt at temperatures higher than 2000° C.

It has been known to prepare carbides of the aforementioned metals from a starting mixture consisting of the oxide of the respective metal and a reducing agent, usually purified coal. The mixture is introduced into a suitable resistance furnace or arc furnace in order to obtain a temperature generally higher than 2000° C. which causes a reaction between the metallic oxide and the coal and the formation of the corresponding metallic carbide. Great care is required in preparing the metallic oxide-coal mixture, particularly as to the proportions of the constituents in the mixture and the choice of furnace type for heating the mixture.

My invention is not concerned with a method for preparing the mixture which is to be treated, which may be prepared by any known conventional process, nor is it related to resistance furnaces that are often employed for producing carbides, but is rather related to an electric arc furnace and a method associated therewith.

There are various types of arc furnaces that are usually employed for obtaining boron, titanium and silicon carbides and the like. These furnaces are essentially of the single-phase electric current type, having two electrodes parallel to each other and either vertically disposed or inclined with respect to the horizontal bottom plate of the furnace, heating of the oxide and coal mixture being effected by an electric arc passing from one of the electrodes through the conductive reactant mixture to the second electrode. Such furnaces require special techniques and equipment that are quite complex and necessitate painstaking attention and serve mainly to avoid oxidation or excessive volatilization or both and/or expulsion of the reactant mixture due particularly to the violent arc arction. For those furnaces that have opposed vertical electrodes (vertical arc) with respect to the bottom plate of the furnace, in addition to the aforementioned drawbacks, there is a tendency for the arc to sink within the charging material resulting in a great decrease in furnace output. Another serious disadvantage of known arc furnaces is that only part of the charged mixture is converted to the finished product, that is, the entire mixture does not take part in the reaction and consequently a portion of the mixture is not transformed into the carbide.

It is accordingly an object of the present invention to provide an arc furnace which is either of the single-phase or three-phase electric current type provided with vertical electrodes and a method of operating the same so as to produce in a simplified and rapid manner substantially pure powdery carbides and/or carbides in a molten state.

An outstanding feature of my invention is to provide a furnace in which a starting mixture is converted entirely to carbide as the finished product, so that no residues of unreacted and/or partially reacted material remain in the furnace at the end of the operation, the residues being recycled or treated as by-products when removing the carbide obtained from the reaction.

Other features which are considered as characteristic for the invention are set forth in the appended claims. The invention, however, both as to its construction and method of operation, together with additional objects and advantages thereof, will be best understood from the following description of specific embodiments when read in connection with the accompanying drawings, in which:

Similar reference numerals in the various figures refer to analogous elements.

Figure 1:
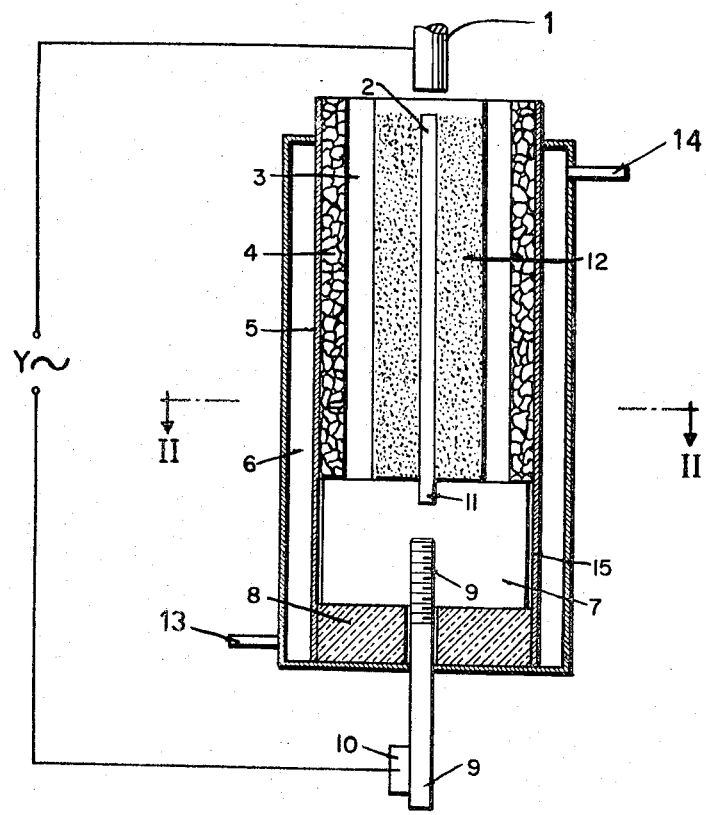
FIG. 1 is a longitudinal section taken along the axis of an arc furnace constructed in accordance with my invention.
Figure 2:
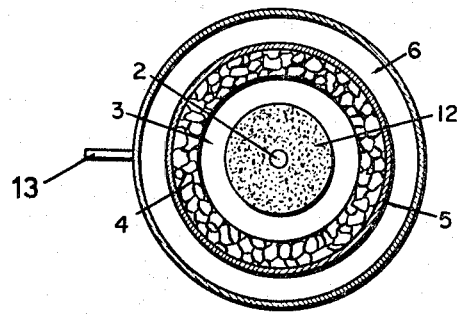
FIG. 2 is a horizontal section taken along the line II—II of FIG. 1 in the direction of the arrows.

The furnace shown in FIGS. 1 and 2 is provided with a strong metallic casing 5 which is preferably cylindrical and which is surrounded along its entire length with a continuous cooling system consisting of a water jacket 6 through which water is forcibly circulated from the water inlet 13 located at the lower end of the furnace and out through the outlet 14 located at the opposite upper end of the furnace. The continuous cooling system can also consist of a water-spray device which permits water to be sprinkled over the casing 5 continously from a circular water pipe, for example, arranged at the top of the furnace casing concentrically and coaxially with the casing and provided with a plurality of spaced holes through which water sprays onto the casing 5.

An insulating refractory layer 8 is provided within the furnace casing 5 at the base thereof for insulating the bottom wall of the interior furnace structure. A cylindrical block 7 of electrically conductive material, preferably graphite, is located on the layer of refractory material 8 and has a thickness that varies from 10 to 50 cm. depending on the diameter and throughput of the furnace.

The cylindrical block 7 which forms the base of the furnace has a diameter 1 to 3 centimeters less than the inner diameter of the metallic casing 5 of the furnace.

The base block 7 of the furnace is electrically insulated from the metallic casing 5 by an asbestos board or cloth 15 or, if desired, by a powdery non-conductive material such as zirconium oxide, alumina or the like.

The furnace base block 7 constitutes one of the electric poles or electrodes and is securely and electrically connected to a current conductor rod 9 which is insulated from the metallic casing 5 of the furnace by means similar to the insulation 15.

The current conductor rod is water-cooled. It consists of copper or brass or the like and is inserted, for example, by being threaded into the base block 7 to provide exceptionally good electrical contact therewith. Although the current conductor rod is shown in FIG. 1 to be coextensive with the vertical axis of the furnace, it may however, be located in other suitable positions.

Outside of the furnace the current conductor rod 9 carries a metallic plate 10 to which electrically energizable cables are secured and energized by the A.C. source Y.

A hollow cylinder 3 is mounted on or built onto the top of the base block 7 and is made of carbon-like material such as graphite or amorphous carbon, for example. The cylinder 3 which defines the inner chamber 12 of the furnace does not have to be formed of an integral member but can consist of a number of elements that are arranged together to form a cylindrical chamber wall.

The outer diameter of the cylinder 3 which defines the furnace reaction chamber 12 is less than the inner diameter of the furnace casing 5 by from 5 to 40 cm. depending on the power capacity and the diameter of the furnace.

An annular chamber 4 which forms an insulating gap is defined by the inner surface of the casing 5 and the outer surface of the cylinder 3. This gap is usually filled without compression with coke or blocks of amorphous carbon of relatively small size or with other material which can endure high temperatures while simultaneously having the quality of being thermally insulating.

A graphite electrode 2 coextensive with the vertically disposed longitudinal axis of the furnace as viewed in FIG. 1 is joined with the base block 7 of the furnace at a simple fixed junction 11. Such a junction can be effected by any suitable means of rigidly connecting the electrode to the base block so as to afford good electric contact and at the same time ensure rigid vertical disposition of the electrode 2 such as by a friction fit, welding, threading, and the like. This vertical arrangement affords the advantage of permitting the base block 7 to be readily removed from inside the furnace casing 5.

The furnace chamber 12 is filled up to the upper end of the graphite electrode 2 with the charge mixture that is to be converted to the metallic carbide.

The furnace operation is intermittent and as an example for the production of boron carbide, the operation time is determined by the total length of time it takes to convert the charge mixture which has been previously admitted to the cold furnace to the respective carbide.

For production of other carbides such as those of silicon, zirconium, and the like, and in the three-phase electric current furnaces, suitable provision may be made for feeding the charge mixture into the furnace during operation; however such continuous feeding is generally not advisable.

Operation of the furnace is initiated by causing an electric arc to strike between the electrode 1 exterior to the furnace and the arc-guide electrode 2 immersed in the charge material which fills the entire furnace chamber 12. The heat released by the arc starts the reaction between the components of the charged mixture, such as boron oxide ($B_2O_3$) and coal for example. Initially, the reaction occurs only in the immediate vicinity of the electric arc.

Since the arc-guide electrode 2 has been suitably formed with a cross-sectional area that is less than that of the electrode 1 and a diameter which is not in any case higher than 60% of the diameter of electrode 1, the electrode 2 is heated by self-resistance along its entire length to a temperature of 1500° to 1800° C. The entire charge mixture is thereby preheated to such a temperature as to start the reaction which transforms the charge to a pasty semi-solid mass from the powdery or granular form that it had when initially introduced into the furnace chamber 12.

The furnace structure makes effective preheating of the entire charge mixture possible, since the crucible cylinder 3 is permitted to assume the temperature of the charge within the chamber 12 due to the fact that the cylinder 3 and the charge in the chamber 12 are both enclosed within the antioxidizing insulation provided in the annular chamber 4.

Due to the aforementioned smaller sectional area of the arc-guide electrode 2 as compared to that of the outer electrode 1, the electrode 2 is consumed more rapidly than the electrode 1 and the electric arc striking between the ends of both electrodes progressively descends or penetrates into the furnace as it consumes the arc-guide electrode 2, until it finally reaches the furnace base block 7 when all of the electrode 2 is completely consumed.

The rate of advance of the arc which coincides with the consumption of the electrode 2 is in direct ratio to the diameter of the electrode 2, the inner diameter of the crucible cylinder 3 and the mass and type of constituents of the charge mixture.

The amount of the charge mixture is predetermined so that as the electrode 2 is progressively consumed by the arc, as a function of the rate and power thereof, it is able to cause a reaction between the constituents of the entire charge mass, which is then entirely converted to the carbide. Moreover, as the electric arc progressively advances downwardly, the charge mass in succeeding zones consisting of entire horizontal sections of the charge attains a temperature necessary to promote the reaction or the charge mass so that the entire charge mass contained within the insulated crucible cylinder 3 enters into the reaction.

As the electric arc consuming the electrode 2 gradually sinks into the charge mixture, the carbide-forming reaction continuously produces carbon monoxide (CO) gas which forms a protective atmosphere against oxidation of the previously formed carbide in the upper regions of the furnace chamber as those regions cool. The conversion of the charge to the carbide results in the formation of a layer of the carbide mass which is consolidated and partially melted and which adheres to the inner wall of the crucible cylinder 3. This layer is formed also as a result of the violence with which the electric arc hurls the charge mixture toward the crucible walls.

In order to maintain a constant CO atmosphere inside the furnace chamber 12, a suitable movable refractory covering (not shown) for the top of the furnace can be utilized and can be provided with well-known venting means for releasing the gas that is formed when a certain maximum pressure is produced, and which can also be suitably constructed so that the electrode 1 may be easily introduced therethrough so as to be within optimal arc distance of the electrode 2.

The electrode 1 is operated by conventional servo control mechanisms that are well-known in the art of electric arc furnaces.

When the arc from the electrode 1 has entirely consumed the arc-guide electrode 2 and the end of the arc then strikes against the base block 7 of the furnace, the operation is at an end and the furnace, which remains closed, is permitted to cool.

The recovery of the carbide that is formed takes place as follows: The electrode 1 is removed, the furnace casing and jacket 5, 6 are drawn in a downward direction as viewed in FIG. 1 away from the base block 7 after previously withdrawing the current conductor rod 9 in the event it impedes the removal of the casing. The insulating carbon or coke in the annular chamber 4 consisting of loose particulate material then falls away under the action of gravity or is removed by hand. The crucible cylinder 3 is thus left uncovered and can be readily removed as it simply rests or sits loosely on the base block 7. The inner crust of carbide that has formed in the crucible cylinder 3 is then readily removable by scraping and the carbide is thereby recovered. The furnace is then reassembled and is ready for another operation.

Following is a typical example practiced in accordance with my invention:

A single-phase electric current furnace constructed in accordance with FIGS. 1 and 2 and suitable for producing boron carbide is energized with a power of 150 kilowatts. It is furnished with a crucible cylinder of 1.30 meters depth and an inner diameter of 300 mm., and has an outer electrode with a diameter of 100 mm. and an arc-guide electrode of 35 mm. diameter.

On the basis of tests carried out during the reaction of the boron carbide producing charge mixture in a furnace having the aforementioned features, substantially the entire charge mixture that was introduced had been converted to high titre carbide at the end of the reaction.

Figure 3:
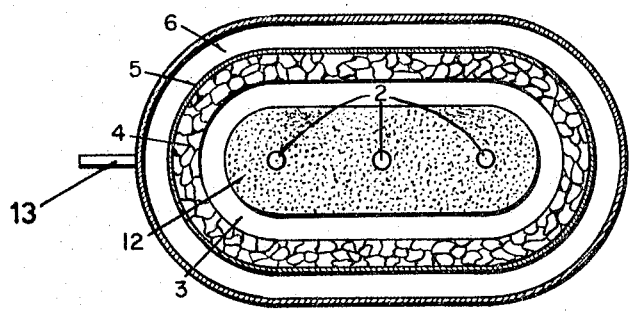
FIGS. 3 and 4 are horizontal sections of different embodiments of an electric arc furnace constructed in accordance with my invention in which a three-phase electric current is employed for heating the furnace.
Figure 4:
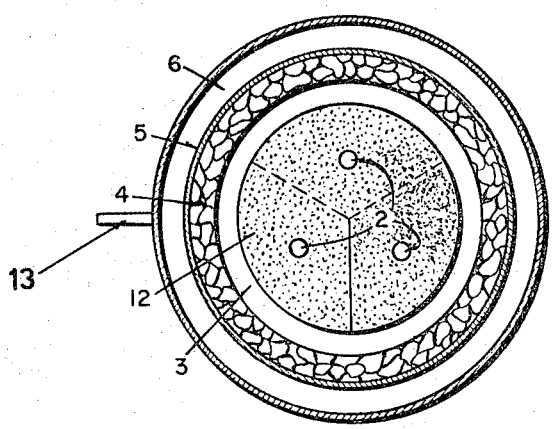

The basic construction of the above-described furnace can also be employed for three-phase electric current with only a slightly different structural arrangement as illustrated in FIGS. 3 and 4 which are self-explanatory in light of the preceding description of the embodiment shown in FIGS. 1 and 2.

The sectional area of the furnace crucible is predetermined by the zone over which the electric arc has the highest influence. The arc should be able to extend at the temperature of the reaction across the entire crucible sectional area. Accordingly, this area must be determined as a function of the over-all power capacity of the furnace and of the material that is to enter into the reaction.

While my invention has been illustrated and described as an apparatus and method for the production of abrasive carbides, it is not intended to be limited to the details shown, since various modifications and structural changes may be made without departing in any way from the spirit of the present invention. Such adaptations should and are intended to be comprehended within the meaning and range of equivalents of the following claims.

I claim:

1. An electric arc furnace for the production of carbides comprising a cylindrical metallic casing having a bottom wall; a layer of electrically insulating refractory material supported in said casing on said bottom wall; a block of electrically conductive material superposed on said insulating material; a hollow tube of carbon-like material supported endwise on said block, said tube defining with said block a furnace reaction chamber adapted to be filled with a carbide-forming chrage; an arc-guide electrode of electrically conductive material electrically connected to said block and extending upwardly therefrom in said furnace reaction chamber and coaxial with said hollow tube, said electrode being completely covered by the charge when the latter fills said reaction chamber, and a second electrode disposed outside said casing and spaced from said arc-guide electrode.

2. An electric arc furnace according to claim 1, wherein the diameter of said arc-guide electrode does not exceed 60% of the diameter of said second electrode.

3. An electric arc furnace for the production of carbides comprising a cylindrical metallic casing having a bottom wall; a layer of electrically insulating refractory material supported in said casing on said bottom wall; a cylindrical block of electrically conductive material superposed on said insulating material, said block having a diameter smaller than the inner diameter of said casing and being insulated therefrom in the radial direction; a hollow tube of carbon-like material supported endwise on said block, said tube defining with said block a furnace reaction chamber adapted to be filled with a carbide-forming charge; an arc-guide electrode of electrically conductive material electrically connected to said block and extending upwardly therefrom in said furnace reaction chamber and coaxial with said hollow tube, said electrode being completely covered by the charge when the latter fills said reaction chamber, and a second electrode disposed outside said casing and spaced from said arc-guide electrode.

4. An electric arc furnace according to claim 3 wherein said block is radially insulated from said casing by a layer of asbestos sheet.

5. An electric arc furnace according to claim 3 wherein said block is radially insulated from said casing by a nonconductive powdery material.

6. An electric arc furnace for the production of carbides comprising a cylindrical metallic casing having a bottom wall; a layer of electrically insulating refractory material supported in said casing on said bottom wall; a block of electrically conductive material superposed on said insulating material; a hollow tube of carbon-like material supported endwise on said block, said tube defining with said block a furnace reaction chamber adapted to be filled with a carbide-forming charge; an arc-guide electrode of electrically conductive material electrically connected to said block and extending upwardly therefrom in said furnace reaction chamber and coaxial with said hollow tube, said electrode being completely covered by the charge when the latter fills said reaction chamber; a current conductor projecting through the bottom wall of said casing and electrically connected to said block, and a second electrode disposed outside said casing and spaced from said arc-guide electrode.

7. An electric arc furnace according to claim 6, wherein said current conductor comprises a rod with a threaded end portion, said end portion being threadedly secured in a corresponding threaded bore formed in said block.

8. A furnace assembly including an electric arc furnace according to claim 6, wherein an electric contact plate is electrically connected to said current conductor; electrically energizing circuit means electrically connected to said contact plate and to said second electrode for producing an electric arc between said second electrode and said arc-guide electrode.

9. An electric arc furnace according to claim 8, wherein said current conductor is capable of being unscrewed and said casing is free of attachment to said block and slidably disengageable therefrom so that the furnace can be dismantled for removing the carbide that is formed.

10. An electric arc furnace for the production of carbides comprising a cylindrical metallic casing having a bottom wall; a layer of electrically insulating refractory material supported in said casing on said bottom wall; a block of electrically conductive material superposed on said insulating material; a hollow cylinder of carbon-like material supported endwise on said block, said cylinder defining with said block a furnace reaction chamber adapted to be filled with a carbide-forming charge and having an outer diameter smaller than the inner diameter of said casing, said casing and said cylinder being separated by an annular gap filled with heat insulating material; an arc-guide electrode of electrically conductive material electrically connected to said block and extending upwardly therefrom in said furnace reaction chamber and coaxial with said hollow cylinder, said electrode being completely covered by the charge when the latter fills said reaction chamber, and a second electrode disposed outside said casing and spaced from said arc-guide electrode.

11. An electric arc furnace according to claim 10, wherein said heat insulating material consists of high-temperature enduring coke particles.

12. An electric arc furnace according to claim 10, wherein said heat insulating material consists of amorphous carbon blocks.

13. An electric arc furnace for the production of carbides comprising a cylindrical metallic casing having a bottom wall; a layer of electrically insulating refractory material supported in said casing on said bottom wall; a block of electrically conductive material superposed on said insulating material; a hollow tube of carbon-like material supported endwise on said block, said tube defining with said block a furnace reaction chamber adapted to be filled with a carbide-forming charge; an arc-guide electrode of electrically conductive material electrically connected to said block and extending upwardly therefrom in said furnace reaction chamber and coaxial with said hollow tube, said electrode being completely covered by the charge when the latter fills said reaction chamber, a second electrode disposed outside said casing and spaced from said arc-guide electrode; and a continuous cooling system comprising a water jacket surrounding said casing from end to end.

14. An electric arc furnace according to claim 13, wherein said water jacket is provided with a water inlet at its lower end and a water outlet at its upper end diametrically opposed to said water inlet, whereby water can be circulated by force through said cooling jacket for cooling the furnace.

References Cited by the Examiner
UNITED STATES PATENTS

| | | | |
|---|---|---|---|
| 686,551 | 11/1901 | Simon | 13—9 X |
| 941,768 | 11/1909 | Dieffenbach et al. | 13—9 |
| 1,054,372 | 2/1913 | Tone et al. | 23—208 |
| 1,479,662 | 1/1924 | Gray | 13—9 |

JOSEPH V. TRUHE, *Primary Examiner.*